United States Patent
Hunter

(10) Patent No.: US 11,028,671 B2
(45) Date of Patent: Jun. 8, 2021

(54) APPARATUS FOR POWER GENERATION IN A FLUID SYSTEM

(71) Applicant: Tendeka AS, Stavanger (NO)

(72) Inventor: John Hunter, Aberdeen (GB)

(73) Assignee: Tendeka AS, Stavanger (NO)

( * ) Notice: Subject to any disclaimer, the term of this patent is extended or adjusted under 35 U.S.C. 154(b) by 0 days.

(21) Appl. No.: 15/507,785

(22) PCT Filed: Sep. 29, 2015

(86) PCT No.: PCT/EP2015/072481
§ 371 (c)(1),
(2) Date: Mar. 1, 2017

(87) PCT Pub. No.: WO2016/055316
PCT Pub. Date: Apr. 14, 2016

(65) Prior Publication Data
US 2017/0306725 A1    Oct. 26, 2017

(30) Foreign Application Priority Data
Oct. 7, 2014   (GB) ...................... 1417732

(51) Int. Cl.
*E21B 41/00*   (2006.01)
(52) U.S. Cl.
CPC .................. *E21B 41/0085* (2013.01)
(58) Field of Classification Search
CPC ................................................ E21B 41/0085
USPC ................................................... 290/52, 54
See application file for complete search history.

(56) References Cited

U.S. PATENT DOCUMENTS

| | | | |
|---|---|---|---|
| 2,266,355 A * | 12/1941 | Chun | ........................ E21B 4/02 |
| | | | 175/4.56 |
| 2,481,222 A | 9/1949 | Jones | |
| 5,839,508 A * | 11/1998 | Tubel | .................. E21B 41/0085 |
| | | | 166/65.1 |

(Continued)

FOREIGN PATENT DOCUMENTS

| | | |
|---|---|---|
| GB | 2509931 A | 7/2014 |
| WO | WO-2007/021295 A2 | 2/2007 |

(Continued)

OTHER PUBLICATIONS

International Search Report PCT/ISA/210 for International Application No. PCT/EP2015/072481 dated Feb. 2, 2016.

(Continued)

*Primary Examiner* — Tara Schimpf
*Assistant Examiner* — Dany E Akakpo
(74) *Attorney, Agent, or Firm* — Harness, Dickey & Pierce, P.L.C.

(57) ABSTRACT

A turbine has a flow pathway with an inlet in communication with the fluid channel. A rotor is disposed in the flow pathway and is rotatable around a rotation axis under the action of fluid flowing along the flow pathway. The rotation axis of the rotor is oblique to an axis extending along the fluid channel. The outlet of flow pathway may return fluid to the fluid channel. The turbine may also be provided with a flow control arrangement so as to vary the flow of fluid past the rotor and to prevent the rotor from damage. The rotor may be positioned apart from the fluid channel and so as not to obstruct the fluid channel.

21 Claims, 5 Drawing Sheets

(56) References Cited

U.S. PATENT DOCUMENTS

| | | | | |
|---|---|---|---|---|
| 2004/0221997 | A1* | 11/2004 | Giroux | E21B 21/08 166/380 |
| 2005/0051323 | A1* | 3/2005 | Fripp | E21B 41/0085 166/65.1 |
| 2006/0100968 | A1 | 5/2006 | Hall et al. | |
| 2008/0047753 | A1 | 2/2008 | Hall et al. | |
| 2009/0160193 | A1* | 6/2009 | Farb | F03B 13/00 290/54 |
| 2013/0153242 | A1* | 6/2013 | Flight | E21B 33/0355 166/363 |
| 2015/0090380 | A1* | 4/2015 | Steenwyk | B60C 19/00 152/152.1 |
| 2016/0145975 | A1* | 5/2016 | Carroll | E21B 41/0085 166/244.1 |
| 2016/0265315 | A1* | 9/2016 | Frosell | E21B 41/0085 |

FOREIGN PATENT DOCUMENTS

| | | |
|---|---|---|
| WO | WO-2007/137424 A1 | 12/2007 |
| WO | WO-2014/105053 A1 | 7/2014 |
| WO | WO-2016/043762 A1 | 3/2016 |

OTHER PUBLICATIONS

Written Opinion of the International Searching Authority PCT/ISA/237 for International Application No. PCT/EP2015/072481 dated Feb. 2, 2016.

Great Britain Search Report for Great Britain Application No. GB1417732.3 dated Dec. 15, 2014.

Great Britain Search Report for Great Britain Application No. GB1417732.3 dated Dec. 9, 2016.

Australian Examination Report for corresponding Application No. 2015330251, dated Jul. 8, 2019.

* cited by examiner

APPARATUS FOR POWER GENERATION IN A FLUID SYSTEM

CROSS-REFERENCE TO RELATED APPLICATIONS

This application is the U.S. National Phase application of PCT Application No. PCT/EP2015/072481 filed on Sep. 29, 2015, which claims priority to Great Britain Application No. 1417732.3 filed on Oct. 7, 2014 the entire contents of each of which are incorporated herein by reference.

FIELD

Embodiments described herein relate to power generation in a fluid system and in particular to apparatus for extracting energy from fluid flow in pipelines or fluid conduits, such as are found in the oil and gas exploration and production industry.

BACKGROUND

Systems associated with fluid flow systems, and their monitoring and control, may require a power source. For example, in the oil and gas industry, throughout the lifetime of a well, it may be required to supply power to apparatus in the well. Such powered systems can include, for example, actuation systems requiring mechanical operation such as flow control devices, chokes, valves, etc., sensors such as pressure sensors, communications systems, diagnostic systems, and the like.

It may be convenient for apparatus to be powered by a local power source. In some instances it may be impractical or impossible to supply power from the surface. Increasingly, placing of downhole components may conflict with future access requirements. For example, it may not be possible for power transmission cables to bypass packers. Apparatus may also become isolated, for example in an old branch of a multilateral well, or where topside installations are removed or abandoned.

Power may be supplied locally from electrical cells or batteries introduced into a well. However, in practice, the operational life of the battery can be significantly reduced due to the challenging environmental conditions found downhole. In addition, power may be required over long periods of time, in some cases over the course of years, and current battery technology may not permit charge to be held for as long as may be required.

To address these shortcomings, it is known to generate power from fluid flowing past a turbine within a conduit, for example as described in the applicant's co-pending UK patent application no. GB 2,509,931. However, such apparatus may not be required or desirable for all applications.

SUMMARY

An aspect or embodiment relates to a turbine for extracting energy from fluid flowing along a fluid channel having an axis; the turbine comprising;
 a flow pathway having an inlet configured to be placed in communication with the fluid channel and an outlet; and
 a rotor disposed within the flow pathway and rotatable around a rotation axis under the action of fluid flowing along the flow pathway;
 wherein the rotation axis is oblique to the axis extending along the fluid channel.

The turbine may provide for the generation or extraction of energy from fluid flowing along a fluid channel by the turbine in use, when the flow pathway of the turbine is in communication with a fluid channel. The rotor may be positioned apart from the fluid channel and so as not to obstruct the fluid channel. Moreover, by virtue of the oblique orientation of the rotor and channel axes, the turbine may be positioned in a compact arrangement around or adjacent to the fluid channel.

The rotation axis and the axis along the channel may intersect. The axes may be orthogonal.

The axes may be radially offset relative to the axis along the flow pathway. The rotation axis may be normal to the channel axis.

The turbine may comprise a rotor of any suitable type or configuration.

The turbine may be an impulse turbine or a reaction turbine.

The turbine may be impingement based, for example comprising a Pelton rotor, a Savonius rotor or the like.

The turbine may be lift based, for example comprising a hydrofoil or aerofoil type rotor or the like.

The turbine may be or comprise a boundary layer (or Tesla) turbine. Thus the rotor may comprise a series of parallel discs.

The rotor may comprise one or more rotor blades, extending from a hub. The rotor blades may be lift-based or impingement-based.

The rotor may comprise one or more nozzles. The flow pathway may extend through the rotor and out of the one or more nozzles.

The rotor may comprise one or more rotor blades helically arranged around the rotation axis. The rotor may comprise one or more rotor blades having faces inclined at an angle to the rotation axis. The rotor may comprise one or more rotor blades having a face aligned with the rotation axis.

The turbine may be configured so that fluid may flow past or through the rotor along the flow pathway obliquely to the rotation axis. For example, in use, fluid may flow along the flow pathway past or through the rotor generally perpendicularly (e.g. tangentially) to the rotation axis (tangential flow).

The turbine may be configured so that fluid may flow along the flow pathway past the rotor generally in alignment with the rotation axis (axial flow).

The rotor may be disposed centrally in the flow pathway.

The rotor may be radially offset from the flow pathway. Fluid flowing along the flow pathway tangentially to the rotor may impinge the rotor to one side of the rotation axis. The rotor, or a part of the rotor may be set into a recess or cavity extending from the flow pathway (e.g. to one side thereof).

In the vicinity of the rotor, the flow pathway may comprise more than one fluid passage. For example, the flow pathway may split/diverge into two or more passages so as to channel fluid past the rotor from more than one direction (e.g. so as to simultaneously impinge upon more than one rotor blade, in use).

The turbine may comprise more than one inlet and/or more than one outlet.

The number of inlets and outlets may be the same, or may be different. The turbine may comprise a greater number of inlets than outlets. For example, more than one inlet of a flow pathway may extend to corresponding passages upstream of the rotor, which converge to a single passage downstream of the rotor.

The turbine may comprise more than one flow pathway, each having an inlet and an outlet.

The outlet of the flow pathway may be configured to be placed in communication with the fluid channel, such that fluid flowing along the flow pathway may be returned to the channel, in use. Alternatively, fluid may be vented or discharged through the outlet.

The inlet and outlet may be axially spaced apart along the channel. For example, the inlet may be upstream of the outlet, in relation to the direction of flow along the fluid channel (accepting that, in some embodiments, the direction of fluid flow along the fluid channel may vary).

The inlet and the outlet may be spaced apart around the periphery of the channel, or alternatively aligned along the channel axis.

The flow pathway may be generally aligned with the channel axis along all or a part of its length.

One or more portions of the flow pathway may be curved or convoluted, and so the direction of fluid flow may change along the length of the flow pathway. One or more portions of the flow pathway may be configured to promote laminar flow.

The flow area may vary along the flow pathway. The flow area may be consistent along the flow pathway.

The flow area may decrease towards the rotor.

Variations in the flow area of the flow pathway may also contribute towards a pressure differential across the rotor, if desired.

The flow area at the rotor may be smaller than the flow area at the inlet. Thus, in use, the speed of the fluid flowing past the rotor may be increased from its speed at the inlet.

The flow area of the flow pathway may increase towards the outlet. A flow area which increases towards the outlet may lead to an enhanced pressure drop between the outlet and the fluid channel, which may facilitate flow of fluid from the flow pathway to the fluid channel (i.e. by virtue of a Venturi effect).

The turbine may be configured to operate bi-directionally. That is to say, the turbine may be configured to permit fluid to flow along the flow pathway from the inlet to the outlet or alternatively from the outlet to the inlet, depending on the direction of fluid flow along the channel.

The turbine may be configured to extract energy from fluid flowing in either direction along the flow pathway or the fluid channel. This may enable energy to be extracted by the turbine during both the injection or producing phases of a well.

The rotor may rotate around the rotation axis in a first direction under the action of fluid flowing along the flow pathway from the inlet to the outlet. The rotor may rotate around an opposite second direction under the action of fluid flowing along the flow pathway from the outlet to the inlet. Alternatively, the rotor may rotate in the same direction regardless of the direction of flow of fluid along the flow pathway.

The turbine may be configured to receive into the flow pathway all, or a portion, of fluid flowing along the fluid channel.

In some circumstances, it may be acceptable for the turbine to operate at a low output (e.g. to trickle charge a battery or accumulator). For example, the turbine may be configured to extract energy when there is a low rate of fluid flow along the fluid channel, and/or utilizing only a minor portion of the fluid flow along the fluid channel.

The turbine may be configured to receive a minor portion (e.g. less than 20%, or less than 10% or less than 5% or 1%) of the fluid flow along the fluid channel, and so have a minor effect on overall fluid flow along the channel.

The turbine may be configured to selectively receive fluid into the flow pathway.

The inlet and/or the outlet of the flow pathway may be provided with a flow control arrangement.

The flow control arrangement may be configured to vary the rate of fluid flow along the flow pathway. The flow control arrangement may be configured to vary the proportion of fluid flowing from the fluid channel and into the flow pathway.

The flow control arrangement may enable regulation of the timing and/or rate of fluid flow along the flow pathway (and thus control over when and/or how much power is generated/extracted by the turbine).

The flow control arrangement may be responsive to variations in flow or fluid conditions, e.g. variations in pressure/flow rate of fluid at the inlet/outlet, variations in composition or phase, and/or variations in the direction of flow.

The flow control arrangement may be operable to open only above a threshold pressure. For example, the turbine may be configured only to function when there is a sufficiently high pressure/flow rate within the fluid channel.

The flow control arrangement may serve to protect the turbine from damage (e.g. physical damage to the rotor or overcharging of a battery or accumulator).

The turbine may comprise an autonomous flow control arrangement. The turbine may comprise an actuable flow control arrangement.

The flow control arrangement may comprise a valve arrangement. The valve arrangement may be configured to restrict or prevent fluid flowing along the flow pathway, when fluid in the fluid channel exceeds a predetermined pressure (or other fluid property, such as temperature, viscosity, phase or composition). Alternatively, the valve arrangement may be configured to allow fluid to flow along the flow pathway, or to increase the flow, when fluid in the fluid channel exceeds a predetermined pressure (or other fluid property, such as temperature, viscosity, phase or composition).

The valve arrangement may be a one-way valve arrangement, configured to permit a greater fluid flow in one direction along the flow pathway and a smaller (or no) fluid flow in the other direction.

The valve arrangement may comprise a valve member. The valve member may be resiliently biased. The valve arrangement may comprise any suitable type of configuration of valve or valve member, such as a non-return valve, a flapper valve a poppet valve or the like.

The outlet (and/or inlet) may for example comprise a flapper valve, which may prevent fluid from flowing into the fluid channel against the flapper valve (e.g. from the outlet to the inlet). A flapper valve may also be urged closed if the pressure or flow in the fluid channel exceeds a predetermined threshold, so as to choke or stop fluid flow along the flow pathway.

The flow control arrangement may be adapted to separate a liquid from a gas. For example, the turbine may be adapted for use with a flow of a gas along the flow pathway and the inlet and/or outlet may be provided with a liquid/gas separator (such as a mesh mist eliminator or the like). Alternatively, the inlet/outlet, or a portion of the flow pathway, may be provided with a membrane by which gas may be separated from liquid in the flow pathway.

A flow control arrangement, and in particular an autonomous flow control arrangement, may comprise a material which changes its shape or configuration responsive to changes in fluid conditions.

For example, a flow control arrangement may comprise a swellable material, or a biasing member formed from or comprising a swellable material which swells on contact with oil or water so as to choke or block the inlet and/or outlet (and which returns to its original shape/configuration when contact with said oil/water ceases). A flow control arrangement may comprise a shape-memory material (such as an alloy or plastics shape-memory material), or a biasing member formed from or comprising a shape-memory material, which changes its shape/configuration with temperature.

A valve member may be operatively coupled to biasing member which changes its shape or configuration responsive to changes in fluid conditions, and may be movable responsive to changes in the shape/configuration of the biasing member.

An actuable flow control arrangement may be actuated responsive to control signals (for example issued to a turbine in a well, from the surface), or may be self-controlling, responsive to variations in flow or fluid conditions.

An actuable flow control arrangement may comprise an electronic, electromechanical, pneumatic and/or hydraulic actuation arrangement.

For example, the flow control arrangement may comprise an actuable inlet (and/or outlet) valve operable responsive to a control signal.

The turbine may comprise a control unit, and a power source such as a battery, operable to actuate the flow control arrangement. The control unit may comprise a processor, operable to receive and respond to a control signal. The control unit may be operable to cause the flow control arrangement to toggle between configurations (for example between open and closed configurations).

A control signal may comprise a sensor reading (such as a reading from a flow rate sensor, a pressure sensor a temperature sensor or a conductivity sensor or the like).

The turbine may comprise required the sensor apparatus, or may be configured to be coupled to sensor apparatus already present in the vicinity of the turbine.

The flow control arrangement may be configured to respond automatically according to signals received from one or more sensors, indicative of predetermined changes in fluid conditions such as temperature, pressure, composition, etc.

Alternatively, or in addition, the flow control arrangement may be operable responsive to a selectively applied control signal. A control signal may for example be an electrical signal, conveyed by a wire (e.g. a wireline or a control cable), or may be a wireless signal (e.g. an acoustic signal, an electromagnetic signal such as a radio or microwave signal, or a signal conveyed by pressure waves) or an optical signal, conveyed by an optical fibre.

Accordingly, the turbine may comprise or be connectable to signal receiving apparatus (such as a said sensor), or may be configured to be coupled to sensor apparatus already present in the vicinity of the turbine.

Other suitable flow control arrangements are known to those skilled in the art.

The turbine may comprise more than one flow control arrangement. For example a flow control arrangement may be associated with the or each inlet and/or the or each outlet.

The turbine may comprise more than one type of flow control arrangement.

The turbine may be configured to convert energy derived from fluid flowing along the flow pathway (kinetic energy) into electrical energy or into another form of energy.

Energy extracted by the turbine may be used concurrently to power apparatus coupled to the turbine. For example, the turbine may be coupled via a mechanical, pneumatic, hydraulic or electrical coupling, to apparatus such as an inflow control device, and the apparatus may be powered directly by energy collected by the turbine.

Alternatively, or in addition, energy extracted by the turbine may be stored for later use. For example, the turbine may be coupled to an energy storage arrangement. The energy storage arrangement may in turn be capable of powering the apparatus.

The turbine may be configured to simultaneously charge the energy storage arrangement and power apparatus coupled thereto. The energy storage arrangement may be configured to simultaneously receive extracted energy and to power apparatus coupled thereto.

The turbine may comprise a stator.

The turbine may comprise an electrical rotor and stator. The stator may comprise a permanent magnet or one or more conductive coils. The rotor may comprise the other of a permanent magnet or one or more conductive coils. Thus rotation of the rotor induces an electromotive force.

The stator may be defined by a portion of the flow pathway extending around the rotor. For example, in embodiments comprising a reaction turbine, the stator may comprise a series of fixed blades disposed around and/or adjacent to the rotor, to divert fluid expelled from the rotor.

The turbine may comprise a drive arrangement coupled to the rotor. The drive arrangement may comprise a gear or a gearbox, configured to transfer mechanical energy to other apparatus, for example to store mechanical potential energy or to operate a mechanical device such as a sliding sleeve, as described below.

The turbine may comprise an energy storage arrangement. The turbine may be configured to be coupled to an energy storage arrangement.

The energy storage arrangement may comprise an electrical or electrochemical storage arrangement, such as a chargeable cell or battery.

The energy storage arrangement may be capable of storing mechanical potential energy.

The energy storage arrangement may comprise a fluid accumulator.

The energy storage arrangement may comprise an elastic member (e.g. an elastomeric member or a resilient member such as a spring, or an inflatable bladder).

An elastic member may be placed in tension or compression using mechanical energy delivered from the rotor via the drive arrangement.

A fluid accumulator may be charged by a fluid pump or compressor coupled to the rotor by the drive arrangement. A fluid accumulator may be charged with fluid from the fluid channel or from another source, such as a wellbore or pipeline in which the turbine is located.

Stored energy may subsequently be utilised to power other apparatus. The stored energy may be utilised directly, for example by electrical apparatus drawing power from an electrical cell/battery.

Alternatively, the stored energy may subsequently be used to drive a turbine or generator. For example, stored mechanical potential energy may be used to drive an electric generator, or stored energy in a fluid accumulator may be used to drive a turbine.

In some embodiments, the turbine may comprise both an electrical stator and a drive arrangement. The turbine may be used in one mode to extract and store energy in a fluid accumulator and, in another mode, to generate electrical energy. Fluid may for example be released from the fluid accumulator and be transferred to the rotor via the drive arrangement.

The compact turbine arrangement made possible by the present invention is particularly suitable for applications in which there are space constraints, for example in relation to apparatus for use in a fluid flow system, such as a pipeline or in a well. In some embodiments, the turbine may be accommodated within the radius of existing downhole apparatus, such as inflow control devices, couplings and the like. Accordingly, apparatus comprise the turbine may compatible with existing wellbore apparatus.

An aspect or embodiment relates to apparatus for use in a fluid flow system (for example downhole apparatus) comprising;
  a body defining a fluid channel having an axis; and
  a turbine coupled to the body and comprising;
    a flow pathway having an inlet communicating the fluid channel and an outlet; and
    a rotor disposed within the flow pathway and rotatable around a rotation axis under the action of fluid flowing along the flow pathway;
    wherein the rotation axis is oblique to the axis extending along the fluid channel.

The fluid channel may be tubular. The body may be generally tubular.

The body may be a fluid conduit or a tubular. The body may comprise a mandrel. The body may comprise an eccentric mandrel.

The body may comprise a connector, e.g. for connecting a tubular to an adjacent tubular, or to two adjacent tubulars (to each end of the body). The turbine may for example form part of or define a pup joint.

The body may define the inlet and/or the outlet of the flow pathway.

One or more parts of the turbine may be formed integrally with the body.

The body (e.g. the walls of a conduit, tubular or mandrel) may define the fluid channel, or at least a portion of the fluid channel.

One or more parts of the turbine (or the entire turbine) may be recessed into the body. One or more parts of the turbine (or the entire turbine) may be recessed into a thickened wall portion of the body, such as a mandrel extending from or connectable to a tubular.

The turbine may be adapted to be secured to the body. For example, the turbine may form part of a collar, which may for example be secured around a tubular (for example by welding or by way of fixings such as bolts). The turbine may form part of a mandrel such as an eccentric mandrel, which may be secured to or around a tubular.

The turbine may form part of a sleeve, which may for example be introduced into the fluid channel.

The turbine may be configured for use with an existing or a standard tubular, such as oilfield tubing.

A standard tubular such as coiled tubing may be machined to form aperture through the walls of the tubular to the fluid channel, to be aligned with corresponding inlet/outlet of the flow pathway.

The apparatus may comprise or be configured for connection to additional components, such a one or more inflow control devices, sensors, logging tools etc., or other powered downhole apparatus as known in the art.

Energy may be supplied to one or more additional components from an energy storage arrangement. Energy may be supplied to one or more additional components by the turbine. Energy may be supplied when the turbine is rotating, or at a later time.

Energy extracted or generated by the turbine may be utilised for example to operate downhole sensors, or downhole apparatus such as inflow control devices and the like.

The apparatus may comprise more than one turbine. More than one turbine may be spaced apart axially on the body. More than one turbine may be circumferentially spaced apart around the body.

The apparatus may be, or form part of, a downhole tool (e.g. a logging tool), a completion string, or a connector for connecting a length of tubular to another length of tubular.

An aspect or embodiment relates to a downhole tool comprising a fluid channel (e.g. a throughbore), comprising a turbine or downhole apparatus according to other aspects.

An aspect or embodiment relates to a completion string having a fluid channel (e.g. a throughbore) extending along the completion string, and comprising a turbine or downhole apparatus according to other aspects. An aspect or embodiment relates to a connector for connecting a length of a tubular to another length of tubular (for example a pup joint), having a fluid channel (e.g. a throughbore) extending through the connector, and comprising a turbine or downhole apparatus according to one or more other aspects.

The inlet to and/or the outlet from the turbine's flow pathway may communicate with the fluid channel. The outlet may vent or be discharged to an outside of the tool/completion string/connector.

One or more parts of the turbine may be formed integrally with the, as the case may be, a body of the tool, a wall of a tubular or mandrel forming part of the completion string, a wall of the connector.

One or more parts of the turbine (or the entire turbine) may be recessed into the body, tubular wall, mandrel, or connector wall, as the case may be.

An aspect or embodiment relates to a method for extracting energy from fluid flowing along a fluid channel, comprising;
  passing fluid from the fluid channel through an inlet to a flow pathway and to an outlet from the flow pathway; past a rotor disposed in the flow pathway; and
  rotating the rotor under the action of the fluid flowing in the flow pathway, around a rotation axis which is oblique to an axis extending along the fluid channel.

The method may comprise venting or discharging fluid from the outlet.

The method may comprise passing fluid from the flow pathway and into the fluid channel through an outlet from the flow pathway.

The method may comprise passing fluid from the fluid channel, along the flow pathway, and returning the fluid to the fluid channel through an outlet from the flow pathway. The method may comprise returning the fluid to the fluid channel via an outlet which is axially spaced apart from the inlet to the flow pathway. Fluid may be returned to the fluid channel through an outlet downstream of the inlet, in relation to the flow of fluid through the fluid channel.

The method may comprise passing fluid from the fluid channel through the outlet, past the rotor disposed in the flow pathway, and returning fluid to the fluid channel through the inlet.

The rotor may thereby be rotated under the action of fluid flowing in the flow pathway, around the rotation axis. The method may comprise rotating the rotor around the rotation axis in a first direction when fluid is flowing along the flow pathway from the inlet to the outlet, and rotating the rotor around an opposite second direction when fluid is flowing along the flow pathway from the outlet to the inlet. Alternatively, the rotor may rotate in the same direction regardless of the direction of flow of fluid along the flow pathway.

The method may comprise varying the speed and/or the pressure of fluid as it flows along the flow pathway. The speed and/or pressure of fluid may be varied by passing the fluid through a region of the flow pathway having reduced and/or an increased flow area.

The method may comprise passing all, or only a portion of fluid flowing along the fluid channel through the flow pathway.

The method may comprise varying the flow of fluid along the flow pathway. The method may comprise varying the proportion of fluid from the fluid channel which flows along the flow pathway.

The method may comprise operating a flow control arrangement. The method may comprise detecting a change in the composition, temperature, pressure or flow rate of the fluid flowing through the fluid channel and consequently varying the flow of fluid along the flow pathway. For example, a flow control arrangement may be operated to choke or stop flow through the flow pathway if a pressure above a threshold pressure is detected, or if water or a slug of gas in the fluid channel is detected.

The method may comprise sending a signal to a flow control arrangement, so as to cause a said flow control arrangement to vary the flow of fluid along the flow pathway.

The method may comprise storing the extracted energy.

The method may comprise charging an electrical cell or battery with electrical energy generated by rotation of the rotor (e.g. by electromagnetic induction).

The method may comprise charging a fluid accumulator.

The method may comprise placing an elastic member in tension or compression, using energy transmitted from the rotor (e.g. via a drive arrangement).

The method may comprise operating a flow control arrangement (to restrict or prevent flow of fluid along the flow pathway) when the amount of stored energy exceeds a predetermined energy storage capacity.

The stored energy may be used to power other apparatus in the fluid system, such as a downhole tool, an inflow control device, a sensor, and the like. The method may comprise directly utilizing the energy extracted by the turbine.

An aspect or embodiment relates to a method for powering apparatus in a fluid system, comprising;
 extracting energy from fluid flowing along a fluid channel, by passing fluid from the fluid channel through an inlet to a flow pathway and to an outlet from the flow pathway, through or past a rotor disposed in the flow pathway, and rotating the rotor under the action of the fluid flowing in the flow pathway, around a rotation axis which is oblique to an axis extending along the fluid channel; and
 powering apparatus in the fluid system using the extracted energy.

The method may comprise storing the extracted energy, and powering the apparatus using the stored energy.

The energy may be extracted and stored over a first period of time, and utilized to power the apparatus for a shorter, second period of time.

The first period of time may be considerably longer (e.g. of the order of 10 times, or 100 times or 1000 times) than the second period of time. For example, the first period of time may be of the order of weeks or months and the second period of time may be of the order of seconds or minutes.

The magnitude of the utilized power may be greater than the magnitude of power generation. Operation of powered apparatus may require energy over a relatively short period of time, but at a high power level. Accordingly, the relative durations of the first and second periods of time may be commensurate with the relative power utilization requirements and power generation capability.

The method may comprise trickle charging an energy storage arrangement (e.g. cell/battery or a fluid pressure or a mechanical accumulator, as the case may be).

The method may comprise stopping energy extraction and/or storage, when an energy storage arrangement is at maximum capacity (e.g. when a battery is fully charged). The method may comprise stopping fluid from flowing along the flow pathway (for example by closing the inlet and/or the outlet).

Charging an energy storage arrangement over a long period of time may necessitate diversion of only a minor portion of fluid flowing along the fluid channel, for example to have a minimal effect on production flow through from a producing well.

Further preferred and optional features of each aspect of the invention correspond to preferred and optional features of other aspects of the invention.

BRIEF DESCRIPTION OF THE DRAWINGS

These and other aspects of the present invention will now be described by way of example only, with reference to the following figures in which.

DETAILED DESCRIPTION OF THE DRAWINGS

Figure 1:
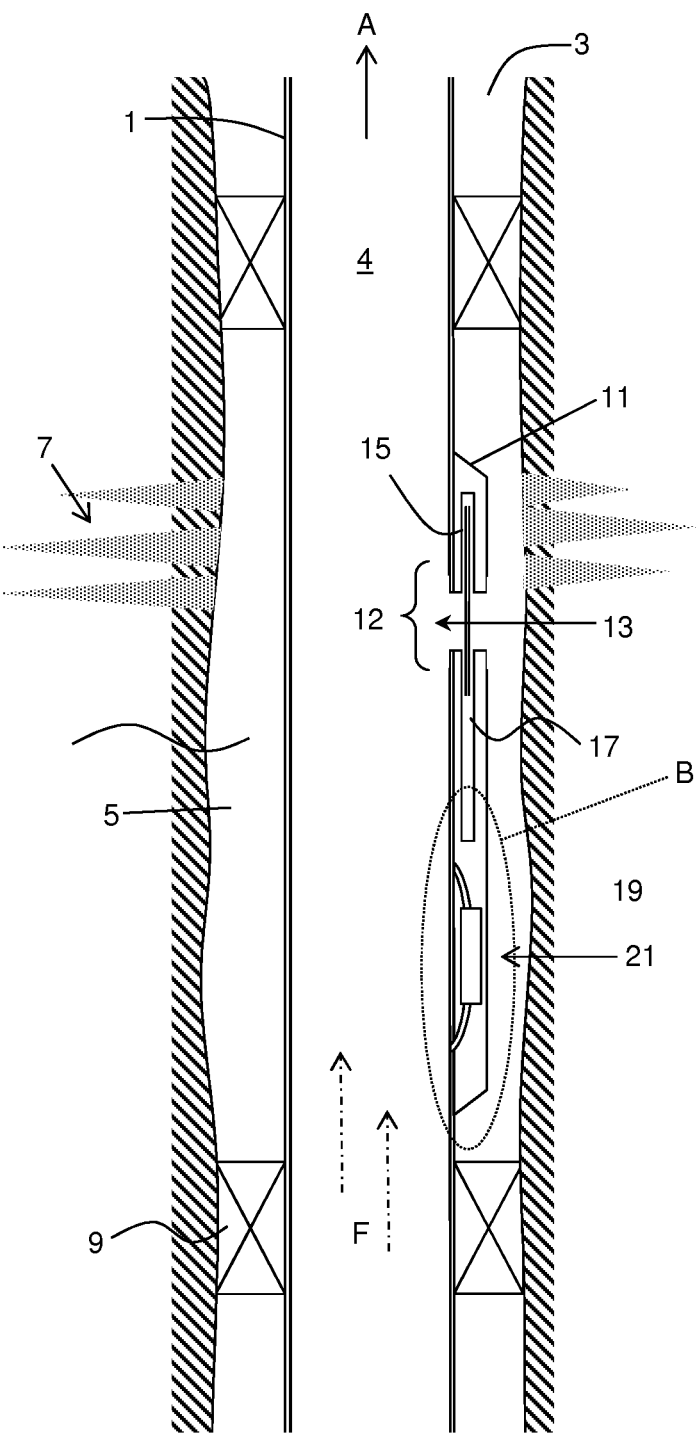
FIG. 1 is a schematic cross sectional view of an embodiment of a turbine in accordance with the invention coupled to an inflow control device.

FIG. 1 shows a schematic cross sectional view of an example embodiment of apparatus for extracting and storing energy from fluid in a well (a fluid system), for use in powering apparatus in the well. A portion of production tubing 1 is shown in a well 3. The production tubing 1 has a bore 4 extending therethrough (a fluid channel), along an axis A. A zone 5 of the well 3 is isolated above and below a producing formation 7, between packer elements 9.

The production tubing 1 includes an eccentric mandrel 11. Fluid flow from the isolated zone 5 into the production tubing 1 is regulated by an inflow control valve 12 mounted in the mandrel 11. The inflow control valve 12 includes a port 13 and a sliding sleeve 15, moveable (by way of an electromechanical actuator, shown in FIG. 2) between a closed position, as shown in FIG. 1, in which the sleeve 15 blocks the port 13 and an open position in which the sleeve is withdrawn into the cavity 17, so that fluid may flow from the producing formation 7, to the isolated zone 5, through the port 13 and into the bore 4 of the production tubing 1.

Figure 2:
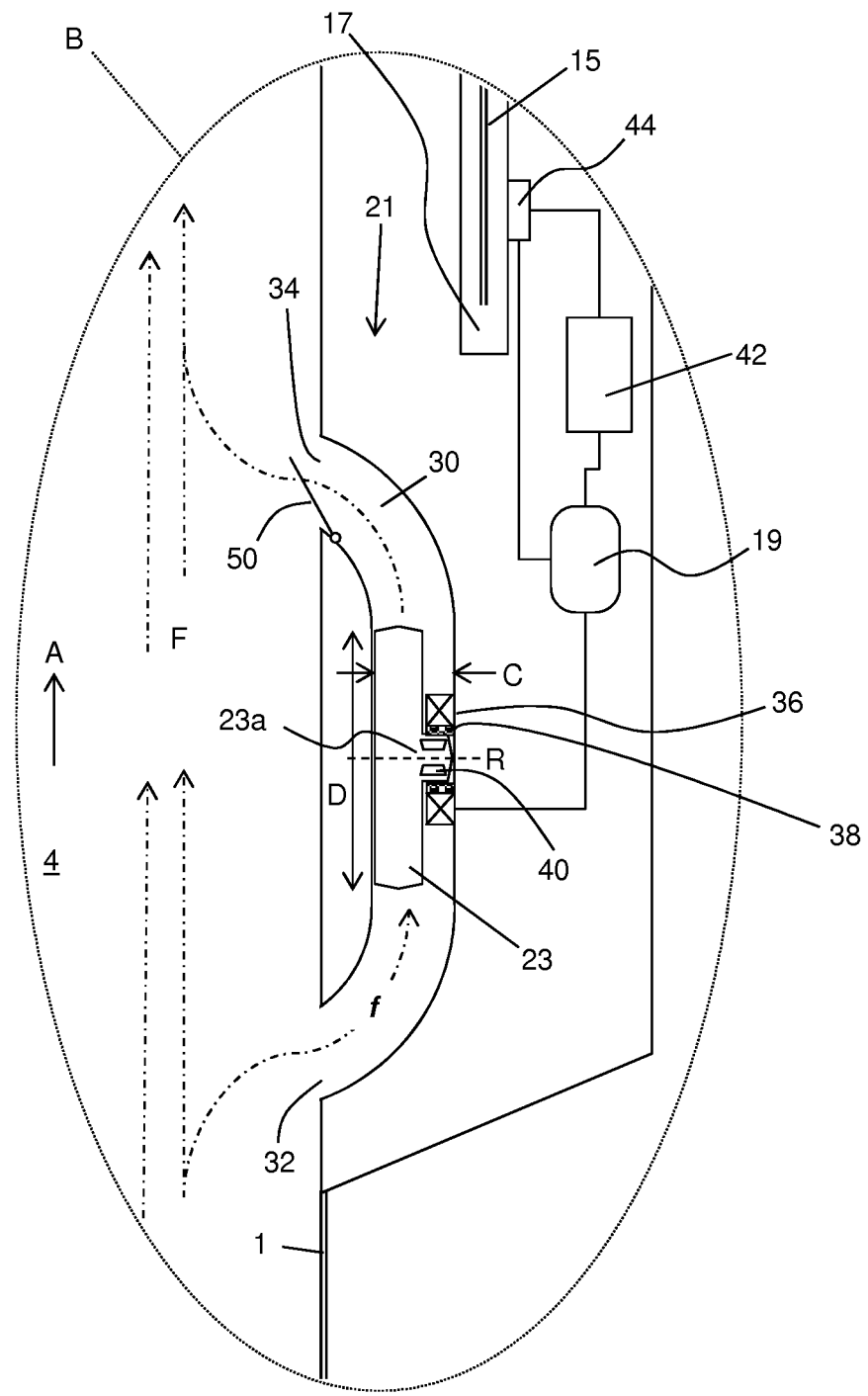
FIG. 2 is a detailed schematic cross sectional view of region B of the turbine shown in FIG. 1.

Electrical power required to move the sleeve 15 between the open and closed positions is supplied from a battery 19 mounted in the mandrel 11 (see FIG. 2).

For clarity, additional components such as a control system, means to communicate with the surface and the like are omitted from the figure.

A turbine 21 in accordance with an embodiment of the invention forms part of and is recessed within the mandrel 11. The turbine 21 does not intrude into the bore 4 of the tubing 1.

FIG. 2 shows a detailed schematic view of region B the mandrel 11 and the turbine 21. The turbine 21 has a flow pathway 30 extending from an inlet 32 communicating with the fluid channel (the bore 4) to an outlet 34. The outlet also communicates with the bore 4, however in alternative embodiments, the outlet may vent or be discharged to an outside of the turbine (e.g. into the well). The outlet 34 is axial spaced apart from the inlet 32, so that fluid flowing along the flow pathway 30 returns to the bore 4 through the outlet downstream of the inlet (in relation to fluid flow F).

The flow pathway 30 is configured such that a minor portion f of the fluid flow F is directed into the flow pathway 30, and subsequently returned to the bore. Thus, flow along the fluid channel (bore 4) is substantially unaffected by the turbine 21.

A rotor 23 is disposed in the flow pathway 30. Fluid flowing along the flow pathway 30 causes the rotor to rotate about the rotation axis R. The rotation axis R is oblique to the axis A along the bore 4. In the embodiment shown, the axes are perpendicular to one another and intersect, however it will be understood that other geometries are possible. For example, in alternative embodiments (not shown), the axes may be radially offset or at an angle to one another other than 90 degrees.

The obliquely oriented rotation axis R provides for a compact arrangement of the turbine. For example, in the radial dimension away from the axis A, the turbine 21 is required to accommodate the thickness C, rather than the greater diameter D, of the rotor 23. Accordingly, a larger diameter rotor may be accommodated within a given available radial thickness.

The inlet 32 and the outlet 34 are spaced apart along the axis A of the tubular and are axially aligned such that the flow pathway 30 runs generally parallel to the axis A. In alternative embodiments, the inlet and outlet may be spaced apart around the circumference of the tubular (for example to accommodate other apparatus). Alternative apparatus may include several turbines, which may be spaced apart axially or circumferentially.

The turbine 23 spins around the rotation axis R, within an annular stator 36. An annular bearing 38 is provided between the rotor and the stator. The stator comprises electrical coils. Permanent magnets 40 are embedded within a hub portion 23a of the rotor extending into the stator 36. Thus, an electromotive force is generated when the rotor rotates around the rotation axis R, under the action of fluid flowing along the flow pathway 30.

The stator 36 is electrically connected to a battery 19, which stores energy extracted by the turbine 21 from fluid flowing along the bore 4 and into the flow pathway 30. Under the control of a control unit 42, electrical energy from the battery 19 may be used to power an actuator 44 coupled to the sliding sleeve 15, so as to open and close the inflow control valve 12.

Figure 3:
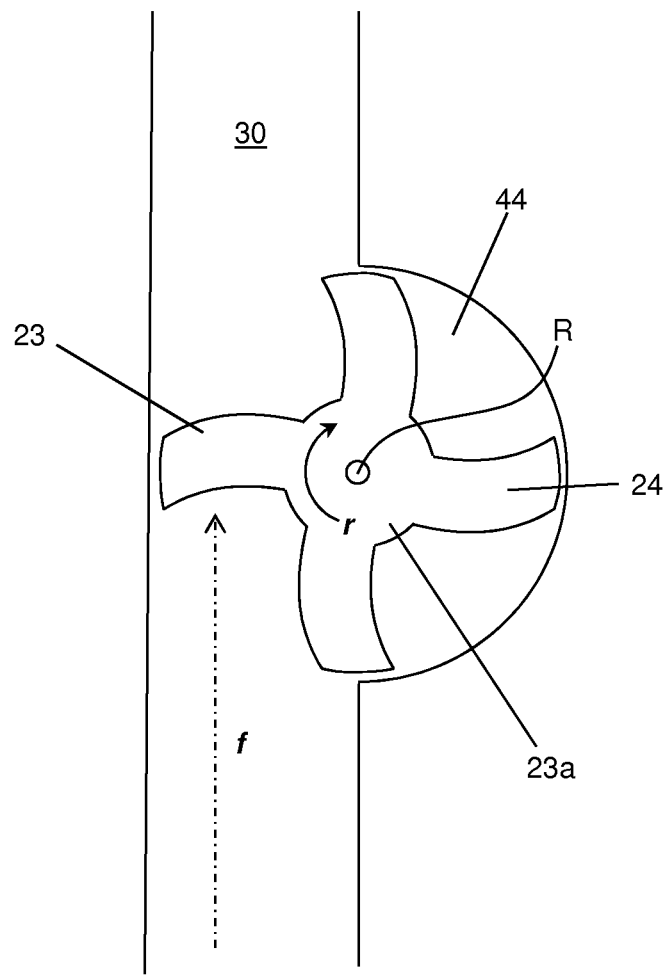
FIG. 3 is a schematic cross sectional view of the rotor of the turbine of FIGS. 1 and 2, along the rotation axis.

FIG. 3 shows a schematic cross sectional view of the turbine 21 through the flow pathway 30, along the rotation axis R. The rotor 23 is a Pelton type rotor, having a hub portion 23a and (in the embodiment shown) four blades 24 extending from the hub portion. The rotor is offset from the flow pathway 30, such a part of the rotor 23 sits within a cavity 44 and a part of the rotor extends into the flow pathway itself. Thus, fluid flowing along the flow pathway in the direction f impinges upon the blades 24 to one side of the rotation axis Q and causes the rotor to rotate in the direction r.

In some embodiments (not shown) the blades are profiled so as to efficiently extract energy from fluid flowing along the flow pathway in the opposite direction (or alternatively, for fluid flowing in the opposite direction to preferentially flow to the other side of a turbine symmetrically disposed in the flow pathway). Moreover, a turbine may be provided with any suitable type of rotor. Whereas the rotor 23 is an impingement based rotor, a lift based rotor may also be used. For example a Darrieus type rotor may be capable of extracting energy from fluid flowing along the flow pathway in either direction.

Turbine 21 is provided with a flow control arrangement at the outlet, in the form of a flapper valve 50, visible in FIG. 2. FIG. 2 shows the flapper valve in an open position.

The flapper valve 50 is biased towards a closed position in which the outlet 34 is blocked. This serves two main functions. Firstly, in the event of fluid flowing in the opposite direction along the bore 4 (for example is mud or another fluid is pumped into the completion string 1), the flapper valve closes and so protects the turbine 21 from damage. Secondly, the flapper valve 50 serves to slightly narrow, or "choke", the flow pathway when the fluid flow F increases in pressure. The flapper valve thereby serves to reduce the proportion of the fluid flow entering the flow pathway, again protecting the turbine (or the battery) from damage in the event of a pressure surge.

In alternative embodiments, not shown, the inlet may also be provided with a flow control arrangement (which may be passive, or which may be powered by the battery).

Figure 4:
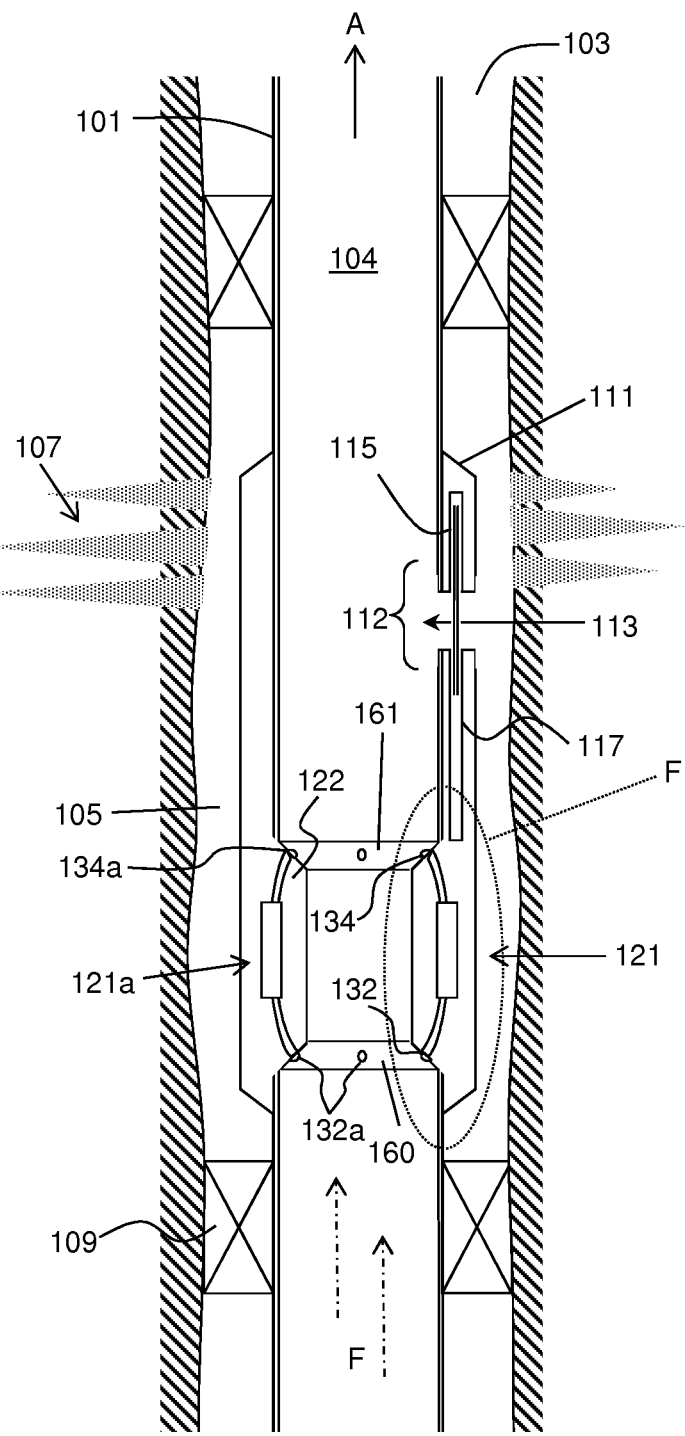
FIG. 4 is a schematic cross sectional view of an alternative embodiment of a turbine in accordance with the invention coupled to an inflow control device.

An alternative embodiment is shown in FIG. 4. Features in common with the embodiment shown in FIGS. 1-3 are provided with like numerals, incremented by 100.

FIG. 4 shows a tubular 101 comprising a mandrel 111 which extends around the tubular 101. A turbine 121 is mounted in the mandrel. The mandrel also comprises (three) further turbines 121a, radially spaced apart around the mandrel. The turbine 121 is operatively coupled to an inflow control valve 112. The other turbines 121a are coupled to other downhole apparatus (not shown).

A part 122 of the turbine extends slightly into the bore 104. The turbine comprises a series of inlets 132, 132a and outlets 134, 134a on the frustoconical surfaces 160 and 161 of the inwardly extending part 122 of the mandrel 121, each associated with a flow pathway and a rotor of a turbine 121, 121a. The extension of the inlets into the fluid flow F along the channel, assists in directing a portion of the fluid flow into the flow pathways of the turbines.

Figure 5:
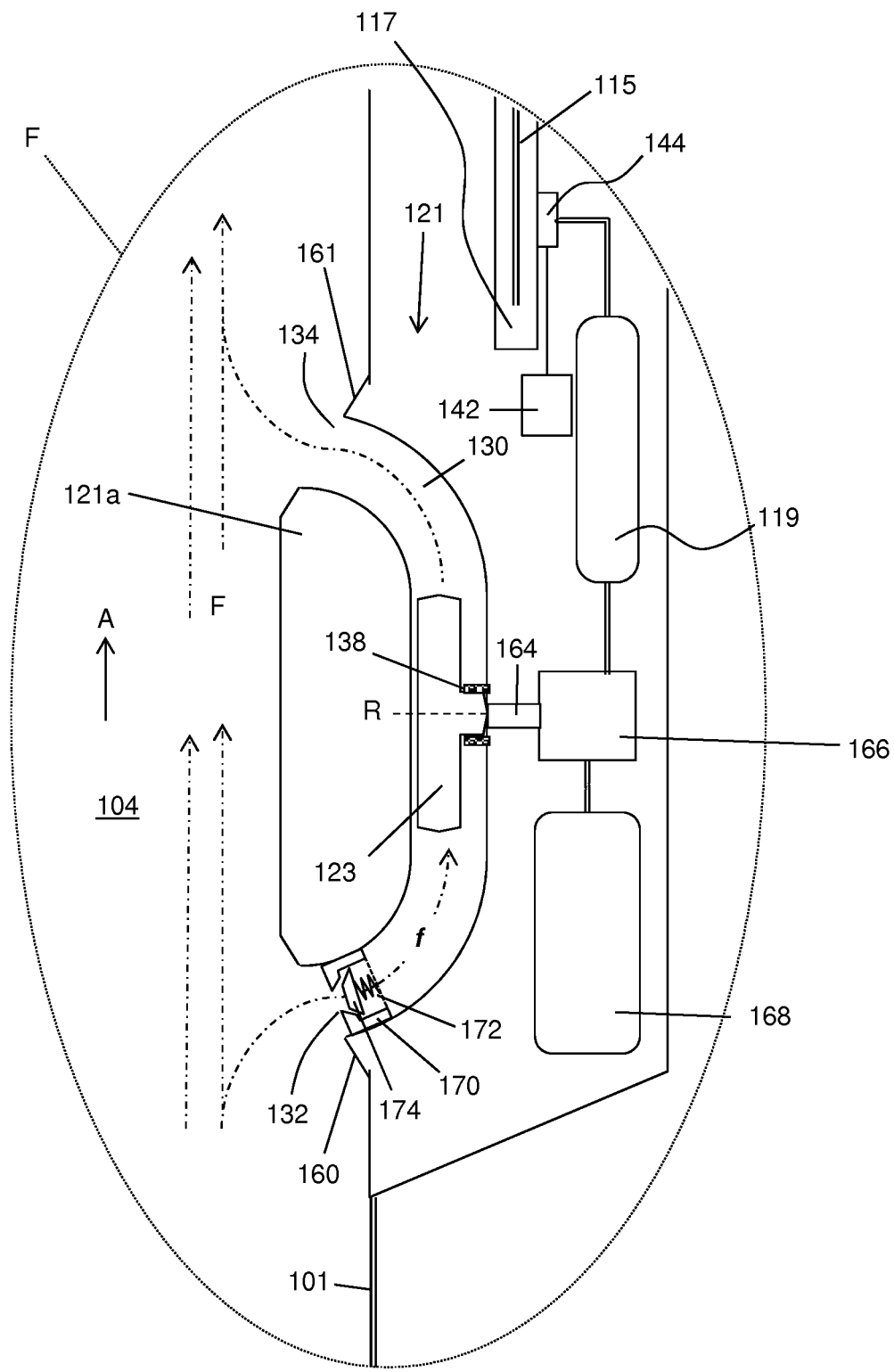
FIG. 5 is a detailed schematic cross sectional view of region F of the turbine shown in FIG. 4.

FIG. 5 shows a detail schematic view of region F, highlighted in FIG. 4, showing the turbine 121. Features common to features shown in FIG. 3 are provided with like reference numerals, incremented by 100.

The rotor 123 is coupled via a drive arrangement, a drive shaft 164, to a compressor 166. The mandrel also comprises a fluid reservoir 168 and a fluid accumulator 119. The compressor is powered by the rotor 123 to pump and pressurise fluid (e.g. compressed air) into the accumulator 119. Under the control of the control unit 142, a pneumatic (or in alternative embodiments hydraulic) actuator 144 may be actuated using compressed fluid from the accumulator 119, so as to move the sleeve 115 and open and close the inflow valve 112.

The inlet 132 is provided with a flow control arrangement 170, in the form of a non-return poppet valve. The non-return valve 170 is configured such that the biasing force of the spring 172 is overcome when a viscous fluid such as crude oil impinges on the valve member 174 (thereby opening the valve member and allowing fluid to flow around and into the flow pathway 130), but not in response to a low viscosity fluid such as water or a gas plug. Accordingly, the non-return valve protects the rotor from excessive contact with such fluids, and reduces additional wear and potential damage associated with mixed phase fluids and/or exposure to sudden changes in fluid characteristics.

While certain embodiments have been described, these embodiments have been presented by way of example only. Indeed the novel apparatus and methods described herein may be embodied in a variety of other forms; and various omissions, substitutions and changes may be made without departing from the spirit of the invention. For example, the apparatus may comprise or be connected to further powered devices, such as sensors or logging apparatus. Operation of the turbine, or of apparatus connected to or powered by energy extracted to the turbine, may function autonomously (e.g. responsive to sensor readings or periodically), or may be controlled remotely, for example by signals transmitted wirelessly (e.g. pressure pulses) or by e-line or optical fibre. The turbine may be configured for various modes of operation, by way of flow control arrangements associated with the flow pathway, for example so as to vary the rate of energy extraction. The turbine may form part of other apparatus, such as a downhole tool, a pup connector or the like. The invention is not limited to downhole applications, may also be used in connection with other fluid systems, such as pipelines, refineries and the like. The turbine may be adapted to extract energy from a flow of gas or of liquid, or indeed from fluid flow of mixed phase. The accompanying claims and their equivalents are intended to cover such forms and modifications as would fall within the scope of the invention.

The invention claimed is:

1. A turbine for extracting energy from fluid flowing along a fluid channel having an axis, the turbine comprising:
   a flow pathway having an inlet configured to be placed in communication with the fluid channel and an outlet, the outlet of the flow pathway configured to be placed in communication with the fluid channel, such that fluid flowing along the flow pathway may be returned to the channel, in use;
   a passive flow control arrangement disposed in the inlet, the outlet, or both the inlet and the outlet of the flow pathway, the passive flow control arrangement extending within the flow pathway, and configured to vary at least one of a rate of fluid flow along the flow pathway or a proportion of fluid flowing from the fluid channel and into the flow pathway in response to changes in at least one of flow characteristics or fluid pressure of a fluid flowing in the fluid channel, so as to protect the turbine from damage; and
   a rotor disposed within the flow pathway and rotatable around a rotation axis under the action of fluid flowing along the flow pathway;
   wherein the rotation axis is oblique to the axis extending along the fluid channel.

2. The turbine according to claim 1, wherein the axes are orthogonal.

3. The turbine according to claim 1, wherein the rotor comprises one or more rotor blades, extending from a hub.

4. The turbine according to claim 1, configured so that, in use, fluid flows past or through the rotor along the flow pathway obliquely to the rotation axis.

5. The turbine according to claim 1, further comprising:
   more than one flow pathway, each having an inlet and an outlet.

6. The turbine according to claim 1, wherein the turbine is configured to operate bi-directionally.

7. The turbine according to claim 6, wherein the turbine is configured to extract energy from fluid flowing in either direction along the flow pathway.

8. The turbine according to claim 1, wherein the passive flow control arrangement comprises a valve arrangement.

9. The turbine according to claim 8, wherein the outlet comprises a flapper valve, configured to prevent fluid from flowing into the fluid channel against the flapper valve.

10. The turbine according to claim 1, further comprising:
    a stator with the rotor; the stator including,
       a permanent magnet or one or more conductive coils; and
    the rotor including,
       the other of a permanent magnet or one or more conductive coils.

11. The turbine according to claim 10, comprising or configured to be coupled to a chargeable cell or battery.

12. The turbine according to claim 1, comprising or configured to be coupled to an energy storage arrangement.

13. Apparatus for use in a fluid flow system comprising:
    a body defining a fluid channel having an axis; and
    a turbine coupled to the body and including,
       a flow pathway having an inlet communicating with the fluid channel and an outlet, the outlet of the flow pathway configured to be placed in communication with the fluid channel, such that fluid flowing along the flow pathway may be returned to the channel, in use;
       a passive flow control arrangement disposed in the inlet, the outlet or both the inlet and the outlet of the flow pathway, the passive flow control arrangement extending within the flow pathway, and configured to vary at least one of a rate of fluid flow along the flow pathway or a proportion of fluid flowing from the fluid channel and into the flow pathway in response to changes in at least one of flow characteristics or fluid pressure of a fluid flowing in the fluid channel, the passive flow control arrangement configured to protect the turbine from damage, and
       a rotor disposed within the flow pathway and rotatable around a rotation axis under the action of fluid flowing along the flow pathway;
    wherein the rotation axis is oblique to the axis extending along the fluid channel.

14. The apparatus according to claim 13, wherein the body is a fluid conduit or a tubular.

15. The apparatus according to claim 14, wherein the body comprises a mandrel and the turbine is recessed into the mandrel.

16. The apparatus according to claim 13, further comprising or configured to connect to an inflow control device, a sensor, a logging tool, or any combination thereof.

17. The apparatus according to claim 16, wherein, in use, energy extracted or generated by the turbine is supplied to said inflow control device, the sensor, the logging tool, or any combination thereof.

18. A method for extracting energy from fluid flowing along a fluid channel, comprising:

passing fluid from the fluid channel through an inlet to a flow pathway and to an outlet from the flow pathway, past a rotor disposed in the flow pathway, the outlet of the flow pathway configured to be placed in communication with the fluid channel, such that fluid flowing along the flow pathway may b returned to the channel, in use;

using a passive flow control arrangement mounted in the inlet, the outlet or both the inlet and the outlet of the flow pathway, the passive flow control arrangement extending within the inlet, the outlet, or both the inlet and the outlet and into the fluid channel, to autonomously vary the flow of fluid along the flow pathway, vary the proportion of fluid from the fluid channel which flows along the flow pathway in response to changes in flow characteristics or fluid pressure of a fluid flowing in the fluid channel or both, the passive flow control arrangement configured to protect a turbine from damage; and rotating the rotor under the action of the fluid flowing in the flow pathway, around a rotation axis which is oblique to an axis extending along the fluid channel.

19. The method according to claim 18, further comprising:

passing only a portion of fluid flowing along the fluid channel through the flow pathway.

20. The method according to claim 18, further comprising:

varying the flow of fluid along the flow pathway, varying the proportion of fluid from the fluid channel which flows along the flow pathway, or both varying the flow of fluid along the flow pathway and varying the proportion of fluid from the fluid channel which flows along the flow pathway.

21. The method according to claim 18, further comprising:

storing the extracted energy.

\* \* \* \* \*